April 5, 1960 J. PICKLES 2,931,424
SEAT ADJUSTING MECHANISM
Filed Sept. 26, 1955 2 Sheets-Sheet 1
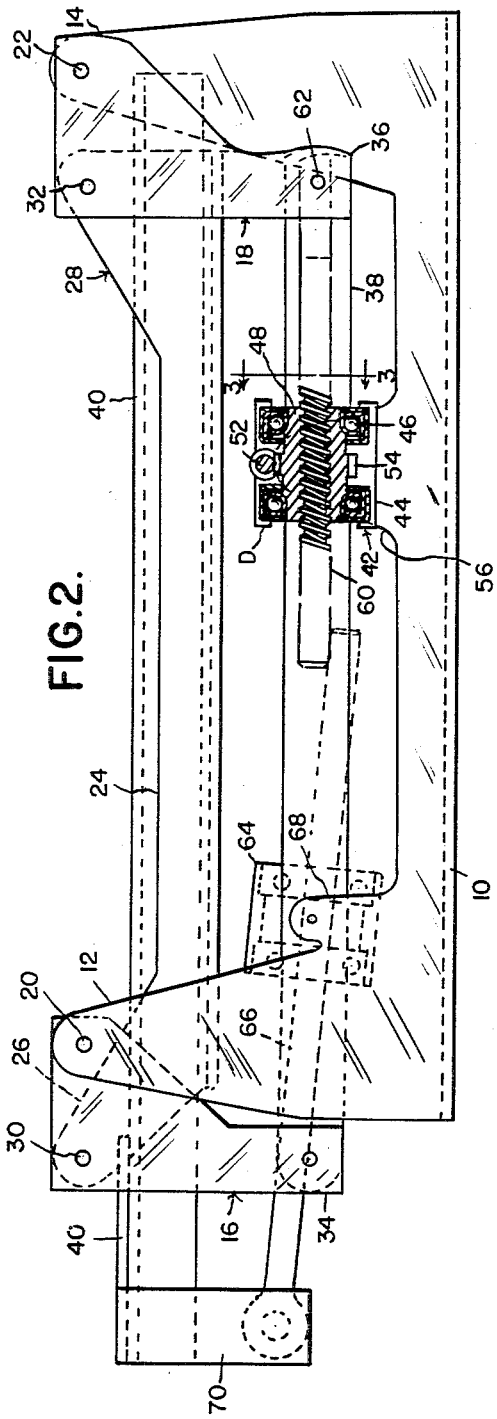
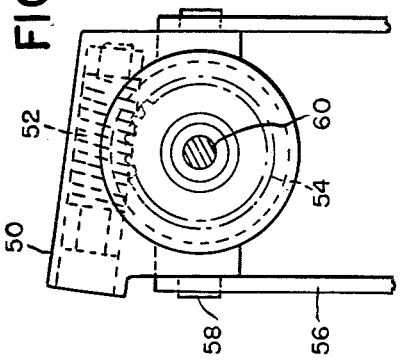
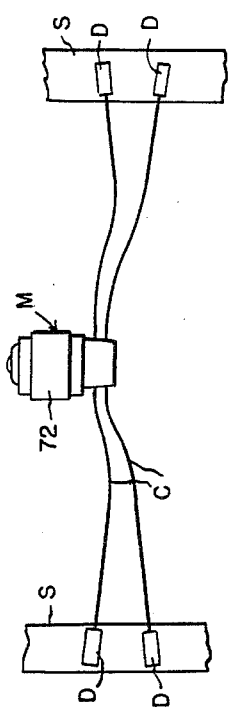
INVENTOR.
JOSEPH PICKLES
BY Whittemore,
Hulbert & Belknap
ATTORNEYS April 5, 1960 J. PICKLES 2,931,424
SEAT ADJUSTING MECHANISM
Filed Sept. 26, 1955 2 Sheets-Sheet 2

INVENTOR.
JOSEPH PICKLES
BY *Whittemore,*
*Hulbert & Belknap*
ATTORNEYS

United States Patent Office 2,931,424
Patented Apr. 5, 1960

2,931,424

SEAT ADJUSTING MECHANISM

Joseph Pickles, Dearborn, Mich., assignor to Ferro Stamping Company, Detroit, Mich., a corporation of Michigan Application September 26, 1955, Serial No. 536,633

9 Claims. (Cl. 155—14)

The present invention relates to seat adjusting mechanism, and more particularly to a construction in which a single motor may be employed selectively to raise, lower, advance and retract a vehicle seat, and includes the possibility of effecting a further adjustment by tilting of the seat.

It is an object of the present invention to provide a seat construction comprising a pair of laterally spaced stationary supports, a support rail mounted on each of the stationary supports for substantially vertical movement, a seat rail slidable longitudinally on each of said support rails, a seat connected adjacent its ends to said seat rails, first reversible drive units connected to each of said support rails for effecting vertical movement thereof, second reversible drive units connected to each of said seat rails for effecting longitudinal adjustment thereof, a reversible motor, and connections between said motor and said drive units comprising selectively operable clutches.

It is a further object of the present invention to provide, in structure of the character described, a drive unit comprising a support, a nut rotatably carried by said support and retained thereby against axial displacement, a screw engaged by said nut, means preventing rotation of said screw, and means for effecting rotation of said nut to thereby drive said screw axially.

It is a further object of the present invention to provide, in seat adjusting mechanism, drive units at opposite sides of a vehicle seat and operatively connected thereto for effecting vertical and horizontal adjustment thereof, a single motor located beneath the vehicle seat, and transmission means including flexible drive cables connecting said motor and said drive units for selective operation thereof.

It is a further object of the present invention to provide selectively operable drive means comprising a reversible electric motor, a pair of rotary elements geared to said motor, a pair of drive units adapted to be connected to said rotary elements, and transmission means connecting said drive units to said rotary elements, said transmission means including selectively operable clutches and flexible drive cables.

It is a further object of the present invention to provide drive mechanism comprising a reversible electric motor, a pair of rotary elements geared to the motor, two pairs of reversible drive units, transmission means connecting each of said rotary elements with a pair of said drive units, said transmission means including flexible cables and a selectively operable clutch for connecting said cables to one of said rotary elements.

Other objects and features of the invention will become apparent as the description proceeds, especially when taken in conjunction with the accompanying drawings, wherein:

Figure 1 is a diagrammatic view illustrating the relationship of parts when the drive system is associated with a vehicle seat.

Figure 2 is a fragmentary side elevational view partly in section, showing the adjustable seat construction, and the associated drive units.

Figure 3 is a fragmentary sectional view on the line 3—3, Figure 2.

Figure 4:
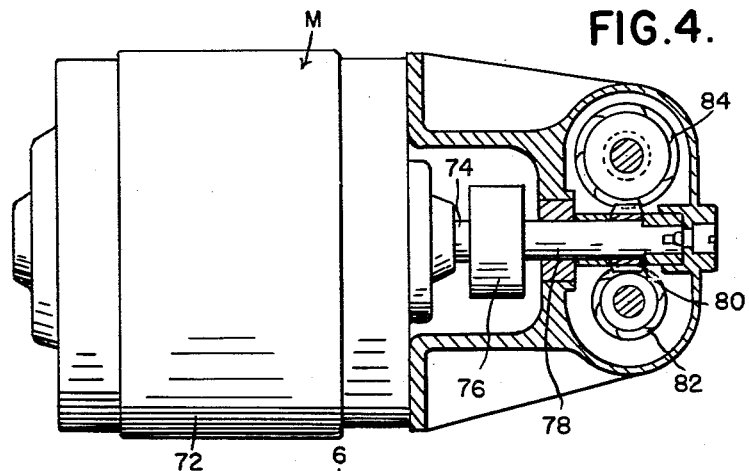
Figure 4 is an elevational view of the motor and control assembly, partly sectioned on the line 4—4, Figure 5.

Referring now to the drawings, Figure 1 diagrammatically represents the arrangement of parts illustrated in the remaining figures. In this figure a pair of adjustable seat supporting assemblies are indicated at S and it will be appreciated that each of these is adapted to be associated with an end of a vehicle seat for effecting the required vertical and horizontal adjustment thereof. Located within the vehicle and preferably beneath the seat is a motor and control unit indicated generally at M. Each of the support assemblies S includes a pair of drive units each of which is designated generically in this figure by the letter D. It will be appreciated that one drive unit at each side of the vehicle is suitably connected to the seat supporting structure so as to effect either vertical or horizontal adjustment of the seat.

In many cases the floor of the vehicle includes a longitudinally and upwardly extending portion covering the transmission shaft connecting the motor to the differential at the rear of the vehicle, and this housing or tunnel interfers with the interconnection of related drive units at opposite sides of the vehicle by a shaft extending transversely of the vehicle. On the other hand, it is essential in order to provide for free adjustment of the seat both horizontally and vertically without binding, that the adjustment take place in identical fashion at opposite ends of the seat. In accordance with the present invention the motor and control unit is connected to the drive units by flexible drive cables indicated in Figure 1 by the letter C. The foregoing general description of the arrangement of parts is given at this time to facilitate an understanding of the detailed description of structure which ensues.

In Figure 2 there is illustrated a supporting structure for a vehicle seat comprising a stationary support 10 adapted to be bolted or otherwise secured to the floor of a vehicle, such for example as an automobile. At opposite ends the support 10 includes upstanding posts 12 and 14. Pivoted to the posts 12 and 14 are bell crank levers 16 and 18, the pivot axes being indicated at 20 and 22 respectively. Pivotally suspended from the bell cranks 16 and 18 is a lower or support rail 24 having at its forward end a forwardly and upwardly extending ear 26 and having at its rear end an upwardly extending ear 28. The ear 26 is pivotally connected to the bell crank 16 at the pivot axis indicated at 30 and the ear 28 is pivotally connected to the bell crank 18 as indicated at 32. The bell crank levers 16 and 18 include depending arms 34 and 36 respectively which are interconnected by a longitudinally extending rigid link 38. The arrangement is such that if forces are applied to either of the bell cranks 16 or 18 so as to induce swinging movement thereof, like swinging movement is imparted to the companion bell crank.

Longitudinally slidable on the support rail 24 is an upper or seat rail 40. The upper or seat rails 40 are provided at opposite ends of the vehicle seat and it will be understood that the assembly of parts just described is provided in pairs for each adjustable vehicle seat. The seat rails are rigidly attached to the seat frame and hence become parts of the vehicle seat.

In order to effect four-way adjustment of the seat; that is, adjustment from front to rear and up and down, each of the assemblies of rails and supports is provided with a pair of drive units. Since these drive units are indentical only one will be described in detail.

In Figure 2 one of the drive units is shown in longitudinal section and is indicated by the reference numeral 42. This drive unit comprises essentially a support or housing structure 44 provided with ball bearings indicated generally at 46, which in turn mount an elongated nut 48 for free rotation in the housing 44.

As best seen in Figure 3, the housing includes a lateral extension 50 which merges into a tubular portion adapted to receive a worm 52. The elongated nut 48 is provided intermediate its ends and around its periphery with teeth forming a worm gear 54 which is in meshing relation with the worm 52.

The housing 44 is pivotally mounted between upwardly extending ears 56 on the support 10, the pivot connection being provided by pins 58.

Received in the elongated nut 48 is a screw 60 which is pivotally secured at one end to the depending arm 36 of the lever 18, the pivot connection being indicated at 62. It will be observed that the pivot connection 62 prevents rotation of the screw 60 so that as the nut 54 is rotated by the worm 52, the screw is moved longitudinally in one direction or the other depending upon the direction of rotation of the worm 52.

Operation of the drive unit 42 as above described will effect simultaneous rocking of the bell cranks 16 and 18 and will accordingly effect substantially vertical movement of the lower or support rail 24.

Similar means are provided for effecting longitudinal adjustment of the upper or seat rail 40 and this means comprises a second drive unit indicated at 64 associated with a screw 66. The drive unit 64 is supported for rocking movement between ears 68 and the screw 66 is pivotally connected at one end to a depending lug 70 at the forward end of the seat rail 40. Actuation of the screw contained in the drive unit 64 in one direction or the other will therefore move the seat rail and hence the seat forwardly or rearwardly.

Figure 5:
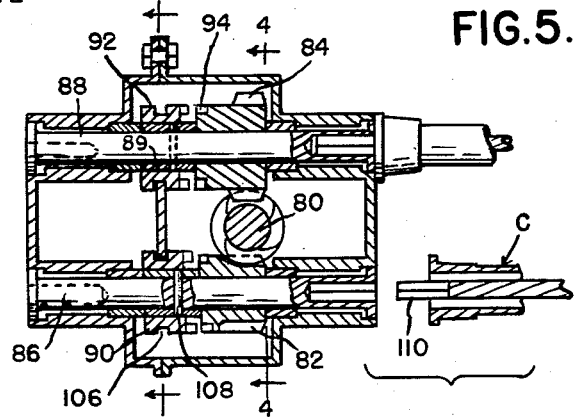
Figure 5 is a fragmentary sectional view on the line 5—5, Figure 4.
Figure 6:
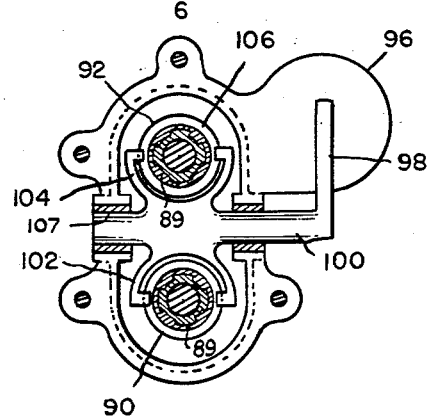
Figure 6 is a fragmentary sectional view on the line 6—6, Figure 5.

Referring now to Figures 4–6 there is illustrated the motor and control unit M. This unit comprises a reversible electric motor 72 having a drive shaft 74 connected by a suitable coupling 76 to a shaft 78 driving a gear or pinion 80. The pinion 80 is in mesh with two gears 82 and 84. Preferably, the pinion 80 and gears 82 and 84 are of the reversible skew drive type having meshing teeth extending at an angle of approximately 45 degrees. This permits location of the shaft of the pinion 80 at 90 degrees with respect to the axes of the gears 82 and 84 and at the same time, permits forward and reverse drive of the gears and provides a speed ratio much more favorable than would be obtained by a worm and worm gear combination. The gears 82 and 84 are mounted for free rotation on shafts 86 and 88 respectively, and slidably secured to splined sleeves 89 pinned to the shafts are clutch elements 90 and 92 respectively. The clutch elements 90 and 92 have teeth shaped to engage in corresponding recesses provided on the gears 82 and 84 as indicated at 94.

Associated with the motor and control unit M is a solenoid received in a laterally projecting portion 96 of the housing and connected by an arm 98 to a round shaft 100 carrying forks 102 and 104 respectively engaged in grooves 106 of the clutch elements 90 and 92. Shaft 100 is mounted for angular movement in bearings 107. The clutch elements 90 and 92 are slidable on sleeves 89 which are pinned to the shafts 86 and 88 by pins 108 so that when either of the clutch elements is engaged with its associated gear, rotation is imparted to the corresponding shaft.

Opposite ends of the shafts 86 and 88 are provided with non-circular recesses for receiving the ends 110 of the flexible drive cables C. The opposite end of each of the flexible drive cables C extends into the tubular portion 50 of the nut housing and is engaged in driving relation to the worm 52.

With the foregoing structure it will be observed that the motor may be energized either in forward or reverse direction. It will further be observed that the motor may be selectively controlled to drive a pair of cables C connecting the shaft 86 to the drive unit 42 and effective to raise and lower the seat. Accordingly, by proper electrical control of the motor and of the solenoid, the seat may be raised or lowered. In like manner, by proper control of the solenoid the motor may be connected to drive the shaft 88 and the pair of cables C connecting the shaft 88 with the drive unit 64 for effecting horizontal adjustment of the seat.

It may be mentioned in passing that if desired, tilting of the seat independent of vertical and horizontal movement may be accomplished by effecting swinging movement of either the lever 16 or the lever 18 independently. This of course requires the omission of the connecting link 38.

The foregoing construction provides a seat adjusting construction characterized by the provision of a single motor for effecting at least four-way adjustment thereof. Moreover, connections are provided from the motor to the adjusting structure at opposite ends of the seat so as to insure synchronously timed movement of opposite ends of the seat so as to avoid binding. Finally, the foregoing is accomplished by a construction which avoids the necessity of a rigid tie rod extending transversely of the vehicle to interconnect operating parts of the seat adjusting structure. Instead, the necessary cross connection is provided by flexible cables which may of course be led over the usual tunnel construction extending longitudinally of the vehicle floor without interference with its function.

While the pinion 80 is shown as connected to only two gears 82 and 84, it will of course be obvious that if desired the shaft 78 could be extended and a second pinion 80 connected to an additional gear or gears so that a single motor could if required, be employed to effect six-way or eight-way adjustment, all without interference with the structure of the vehicle body.

The drawings and the foregoing specification constitute a description of the improved seat adjusting mechanism in such full, clear, concise and exact terms as to enable any person skilled in the art to practice the invention, the scope of which is indicated by the appended claims.

What I claim as my invention is:

1. Adjustable vehicle seat construction comprising a pair of laterally spaced fixed supports, a support rail secured to each of said supports for up and down adjustment, a seat including at each end a seat rail slidable longitudinally on each of said support rails, a first reversible drive unit connected to each of said support rails for raising and lowering the same, a second reversible drive unit connected to each of said seat rails for sliding it longitudinally of said support rail, a single reversible motor mounted in the vehicle beneath said seat, and selectively operable means to couple said motor in driving relation to said first and second drive units, said means comprising pairs of flexible drive cables connected to said drive units.

2. Adjustable support structure for an automobile seat comprising adjustable support devices each including two sets of three elongated superimposed members adapted to be mounted between the floor of the automobile and the ends of a seat and to extend fore and aft of the automobile, longitudinally slidable guide means between a first pair of adjacent members in each set to provide for longitudinal adjustment of the upper member of each set, lift levers between the other pair of adjacent members in each set, power actuated slide means comprising first elongated elements and rotary drive members engaged therewith connected between the uppermost and another member of each set of members, power actuated lift means comprising second elongated elements and rotary drive members engagd therewith connected between said lift levers and one of said superimposed members, a single reversible motor, drive means including flexible cables connecting said motor to all four of said rotary drive members, and clutch means for selectively coupling said motor to the corresponding drive means.

3. Adjustable support structure for an automobile seat comprising adjustable support devices each including two sets of three elongated superimposed members adapted to be mounted between the floor of the automobile and the ends of a seat and to extend fore and aft of the automobile, longitudinally slidable guide means between the upper pair of adjacent members in each set to provide for longitudinal adjustment of the upper member of each set, lift levers between the lower pair of adjacent members in each set, power actuated slide means comprising first elongated elements and rotary drive members engaged therewith connected betwen the uppermost and lowermost member of each set of members, power actuated lift means comprising second elongated elements and rotary drive members engaged therewith connected between said lift levers and the lowermost members of said sets, a single reversible motor, drive means including flexible cables connecting said motor to all four of said rotary drive members, and clutch means for selectively coupling said motor to the corresponding drive means.

4. Adjustable support structure for an automobile seat comprising adjustable support devices each including two sets of three elongated superimposed members adapted to be mounted between the floor of the automobile and the ends of a seat and to extend fore and aft of the automobile, longitudinally slidable guide means between a first pair of adjacent members in each set to provide for longitudinal adjustment of the upper member of each set, lift levers between the other pair of adjacent members in each set, power actuated slide means comprising first elongated threaded elements and rotary drive nut members engaged therewith connected between the uppermost and another member of each set of members, power actuated lift means comprising second elongated threaded elements and rotary drive nut members engaged therewith connected between said lift levers and one of said superimposed members, a single reversible motor, drive means including flexible cables connecting said motor to all four of said rotary drive members, and clutch means for selectively coupling said motor to the corresponding drive means.

5. Selectively controllable drive means for driving pairs of separated but related power devices in synchronism comprising a housing having a drive gear therein, a reversible electric motor mounted on said housing substantially in alignment with the axis of said drive gear and coupled thereto, a pair of driven gears in said housing in constant mesh with said drive gear and disposed with their axes extending at a substantial angle to the axis of said drive gear, a pair of oppositely facing shaft drive couplings disposed in axial alignment with each of said driven gears, a clutch between each of said driven gears and its associated shaft drive couplings, a solenoid mounted in said housing, a rockable clutch actuator mounted in said housing between said clutches and having means connected to both of said clutches, and means connecting said actuator to said solenoid for movement thereby.

6. Adjustable support structure for an automobile seat comprising adjustable support devices each including two sets of three elongated superimposed members adapted to be mounted between the floor of an automobile and the ends of a seat and to extend fore and aft of the automobile, said three members of each set comprising a fixed base member, an upper seat support member, and an intermediate member, a first one of said members being mounted for longitudinal sliding on the next lower member, adjustable lift mechanism connected between a second one of said members and the next lower member, power slide mechanism connected between said first member and a member therebelow comprising a first elongated element, a first relatively rotatable element operatively engaged therewith, first drive means for effecting relative rotation between said first elements to cause relative movement therebetween longitudinally of said first elongated element, said adjustable lift mechanism comprising a second elongated element, a second relatively rotatable element operatively engaged with said second elongated element, second drive means for effecting relative rotation between said second elements to cause relative movement therebetween longitudinally of said second elongated element, a single reversible electric motor, said first and second drive means comprising a first pair of flexible cables adapted to connect said motor to the power slide mechanism of each of said two sets of members, a second pair of flexible cables adapted to connect said motor to the adjustable lift mechanism of each of said sets, and solenoid actuated clutch means for selectively coupling said motor to said first and second pair of cables.

7. Structure as defined in claim 6 in which said elongated elements are threaded shafts, and in which said relatively rotatable elements are nuts.

8. Structure as defined in claim 7 which comprises mounting means for said nuts providing for rotation thereof and effective to prevent axial movement thereof.

9. Adjustable support structure for an automobile seat comprising adjustable support devices each including two sets of three elongated superimposed members adapted to be mounted between the floor of an automobile and the ends of a seat and to extend fore and aft of the automobile, said three members of each set comprising a fixed base member, an upper seat support member, and an intermediate member, guide means disposed between a first one of said members of each device and the next lower member mounting said first member for essentially longitudinal movement relative to the next lower member, vertical adjustment mechanism disposed between a second one of said members of each device and the next lower member mounting said second member for essentially vertical movement relative to the next lower member, horizontal power adjustment mechanism connected between said first member of each device and a support with respect to which said first member is longitudinally movable, said horizontal power adjustment mechanism including a first pair of interengaged actuating elements one of which is rotatable, said vertical adjustment mechanism including for each device a second pair of interengaged actuating elements one of which is rotatable, a single reversible electric motor having separate forward and reverse windings, drive means connecting said motor to the rotatable elements of both pairs of actuating elements of both adjustable support devices, the drive means to the rotatable elements of the pairs of actuating elements of at least one of said devices comprising flexible drive shafts, solenoid actuated clutch means in said drive means for selectively coupling said motor to the horizontal power adjustment mechanism and to the vertical adjusting mechanism of both of said devices, and a circuit including a plurality of switches for selectively and simultaneously energizing selected ones of said motor windings and clutch solenoids.

References Cited in the file of this patent

UNITED STATES PATENTS

| | | |
|---|---|---|
| 1,332,823 | French | Mar. 2, 1920 |
| 1,419,906 | Klausmeyer | June 13, 1922 |
| 1,522,337 | Smaltz | Jan. 6, 1925 |
| 1,847,693 | Kinderater | Mar. 1, 1932 |
| 2,345,182 | Corber | Mar. 28, 1944 |
| 2,349,701 | Buttikofer | May 23, 1944 |
| 2,629,428 | Luketa | Feb. 24, 1953 |
| 2,630,719 | Humbert et al. | Mar. 10, 1953 |
| 2,677,295 | Schmidt | May 4, 1954 |
| 2,707,137 | Hollstein | Apr. 26, 1955 |
| 2,765,024 | Brundage | Oct. 2, 1956 |
| 2,803,146 | Brundage | Aug. 20, 1957 |
| 2,809,689 | Garvey et al. | Oct. 15, 1957 |

FOREIGN PATENTS

| | | |
|---|---|---|
| 457,106 | Italy | May 9, 1950 |